(12) United States Patent
Natanzon et al.

(10) Patent No.: US 10,229,006 B1
(45) Date of Patent: Mar. 12, 2019

(54) PROVIDING CONTINUOUS DATA PROTECTION ON A STORAGE ARRAY CONFIGURED TO GENERATE SNAPSHOTS

(71) Applicant: EMC Corporation, Hopkinton, MA (US)

(72) Inventors: Assaf Natanzon, Tel Aviv (IL); Leehod Baruch, Rishon Leziyon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 444 days.

(21) Appl. No.: 14/980,039

(22) Filed: Dec. 28, 2015

(51) Int. Cl.
  *G06F 7/02* (2006.01)
  *G06F 17/30* (2006.01)
  *G06F 11/14* (2006.01)

(52) U.S. Cl.
  CPC .... *G06F 11/1448* (2013.01); *G06F 17/30097* (2013.01); *G06F 17/30312* (2013.01); *G06F 17/30368* (2013.01); *G06F 17/30949* (2013.01); *G06F 2201/84* (2013.01)

(58) Field of Classification Search
  CPC .. G06F 17/30; G06F 3/0619; G06F 17/30312; G06F 17/30368; G06F 17/30949; G06F 17/3033
  See application file for complete search history.

(56) References Cited

U.S. PATENT DOCUMENTS

| | | | |
|---|---|---|---|
| 7,203,741 B2 | 4/2007 | Marco et al. | |
| 7,647,466 B1 * | 1/2010 | Rao | G06F 11/1458 711/170 |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |

(Continued)

*Primary Examiner* — Bruce M Moser
(74) *Attorney, Agent, or Firm* — Daly, Crowley Mofford & Durkee, LLP (57) ABSTRACT

In one aspect, a method includes receiving an I/O to write data to a volume stored, increasing a hash reference count for a hash of the data in response to receiving the I/O, periodically generating snapshots of the volume, adding metadata on the I/O and a timestamp to a metadata journal and increasing the reference count value in response to adding the metadata.

16 Claims, 5 Drawing Sheets

(56) References Cited

U.S. PATENT DOCUMENTS

| | | |
|---|---|---|
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,271 B1 * | 8/2013 | Tsaur ............... G06F 11/1451 707/640 |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,317,375 B1 * | 4/2016 | Sadhu ............... G06F 11/1451 |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |
| 9,678,680 B1 | 6/2017 | Natanzon et al. |
| 9,678,728 B1 | 6/2017 | Shemer et al. |

(56) References Cited

U.S. PATENT DOCUMENTS

| | | |
|---|---|---|
| 9,684,576 B1 | 6/2017 | Natanzon et al. |
| 9,690,504 B1 | 6/2017 | Natanzon et al. |
| 9,696,939 B1 | 7/2017 | Frank et al. |
| 9,710,177 B1 | 7/2017 | Natanzon |
| 9,720,618 B1 | 8/2017 | Panidis et al. |
| 9,720,619 B1 * | 8/2017 | Shah .................. G06F 12/0253 |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 2007/0300033 A1 * | 12/2007 | Kano .................... G06F 3/0605 711/170 |
| 2011/0231452 A1 * | 9/2011 | Nakajima ............. G06F 3/0605 707/803 |
| 2015/0261792 A1 * | 9/2015 | Attarde ............. G06F 17/30303 707/616 |

\* cited by examiner

PROVIDING CONTINUOUS DATA PROTECTION ON A STORAGE ARRAY CONFIGURED TO GENERATE SNAPSHOTS

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

Most of the modern storage arrays provide snapshot capabilities. These snapshots allow a user to save a freeze an image of a volume or set of volumes at some point-in-time and to restore this image when needed.

SUMMARY

In one aspect, a method includes receiving an I/O to write data to a volume stored, increasing a hash reference count for a hash of the data in response to receiving the I/O, periodically generating snapshots of the volume, adding metadata on the I/O and a timestamp to a metadata journal and increasing the reference count value in response to adding the metadata.

In another aspect, an apparatus includes electronic hardware circuitry configured to receive an I/O to write data to a volume stored, increase a hash reference count for a hash of the data in response to receiving the I/O, periodically generate snapshots of the volume, add metadata on the I/O and a timestamp to a metadata journal and increase the reference count value in response to adding the metadata.

In a further aspect, an article includes a non-transitory computer-readable medium that stores computer-executable instructions. The instructions cause a machine to receive an I/O to write data to a volume stored, increase a hash reference count for a hash of the data in response to receiving the I/O, periodically generate snapshots of the volume, add metadata on the I/O and a timestamp to a metadata journal and increase the reference count value in response to adding the metadata.

DETAILED DESCRIPTION

In some examples, snapshot technology provides crude granularity in the snapshots that are generated. As a consequence a user is not able to restore the volumes to the state that they were in a time period between times that two snapshots were generated. In some examples snapshot technology stores a limited amount of snapshots. Described herein are techniques that enable an efficient native continuous data protection (CDP) mechanism on a storage array that will allow a user to restore a state of volume to any point-in-time for the storage array that provide snapshot images.

The following definitions may be useful in understanding the specification and claims.

I/O REQUEST—an input/output request (sometimes referred to as an I/O or IO), which may be a read I/O request (sometimes referred to as a read request or a read) or a write I/O request (sometimes referred to as a write request or a write).

Figure 1:
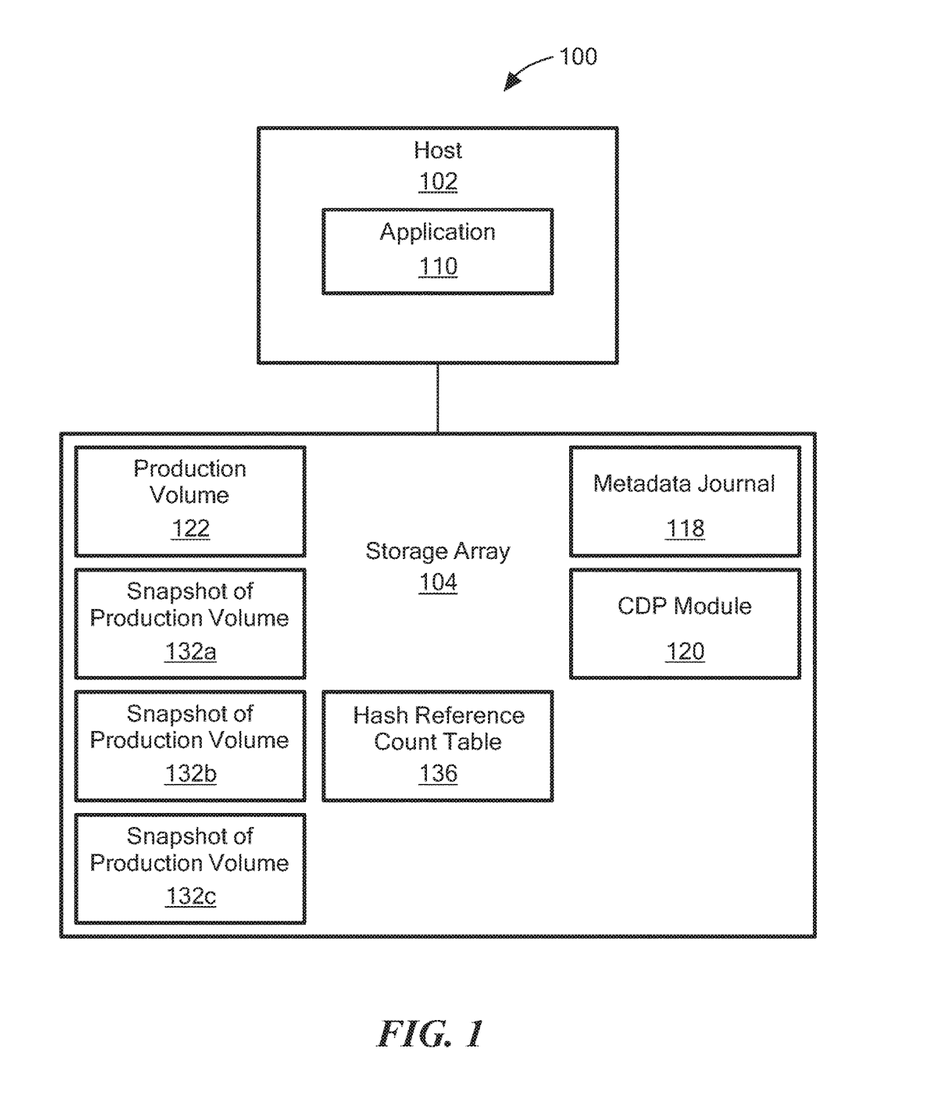
FIG. 1 is a block diagram of an example of a system to provide continuous data protection (CDP), according to one embodiment of the disclosure.

Referring to FIG. 1, a system 100 is an example of a system to provide CDP. The system 100 includes a host 102, which includes an application 110, according to one embodiment of the disclosure. The system 100 also includes a storage array 104. The storage array 104 includes a metadata journal 118, which may be a regular logical unit used to store metadata, a continuous data protection module 120, a production volume 122, snapshots of the production volume (e.g., a snapshot of production volume 132a, a snapshot of production volume 132b and a snapshot of production volume 132c) and hash reference count table 136.

In one example, the CDP module 120 is used to enable the storage array 104 to perform CDP. The metadata journal 118 saves metadata for each I/O.

The application 110 reads and writes data to the production volume 122.

As storage array 104 is a deduplicated storage array, each of the data in the storage array is kept in two separate levels. In a first level, each volume contains a set of pointers from address-to-hash value of the data address (e.g. address-to-hash mapping), which is kept in a compact format. A second level of mapping is a map from hash-to the physical location where the data matching the hash value is stored For each hash there is also a hash reference count which counts the number of references to the data which the hash points to. If the exact same data is saved again later on the storage array then the hash is not saved again but a rather a pointer is added point to the hash. In some examples, in order to allow CDP, the system periodically takes a snapshot of the production volume 122 to form, for example, snapshots 132a-132c.

The hash reference count table 136 is a table of a reference counts for each hash value, and has a pointer from each hash value to its physical location. In one example, each hash reference count value represents a number of entities (e.g., journals, tables) that rely on the hash value. In one particular example, a hash reference count of '0' means no entities in the storage array are using the hash value and the data which the hash points to may be erased. As will be described herein the hash count is incremented for each entity that uses the hash. One of ordinary skill in the art would recognize that system may be configured so that a hash reference counter counts up or counts down for each new entity that depends on the hash value and the hash reference count value may start at any value.

In one example, the storage array 104 is flash storage array. In other examples, the storage array 104 is a deduplication device. In other examples, the storage array 104 may be part of a device used for scalable data storage and retrieval using content addressing. In one example, the storage array 104 may include one or more of the features of a device for scalable data storage and retrieval using content addressing described in U.S. Pat. No. 9,104,326, issued Aug. 11, 2015, entitled "SCALABLE BLOCK DATA STORAGE USING CONTENT ADDRESSING," which is assigned to the same assignee as this patent application and is incorporated herein in its entirety. In other examples, the storage array 104 is a flash storage array used in EMC® XTREMIO®.

Figure 2:
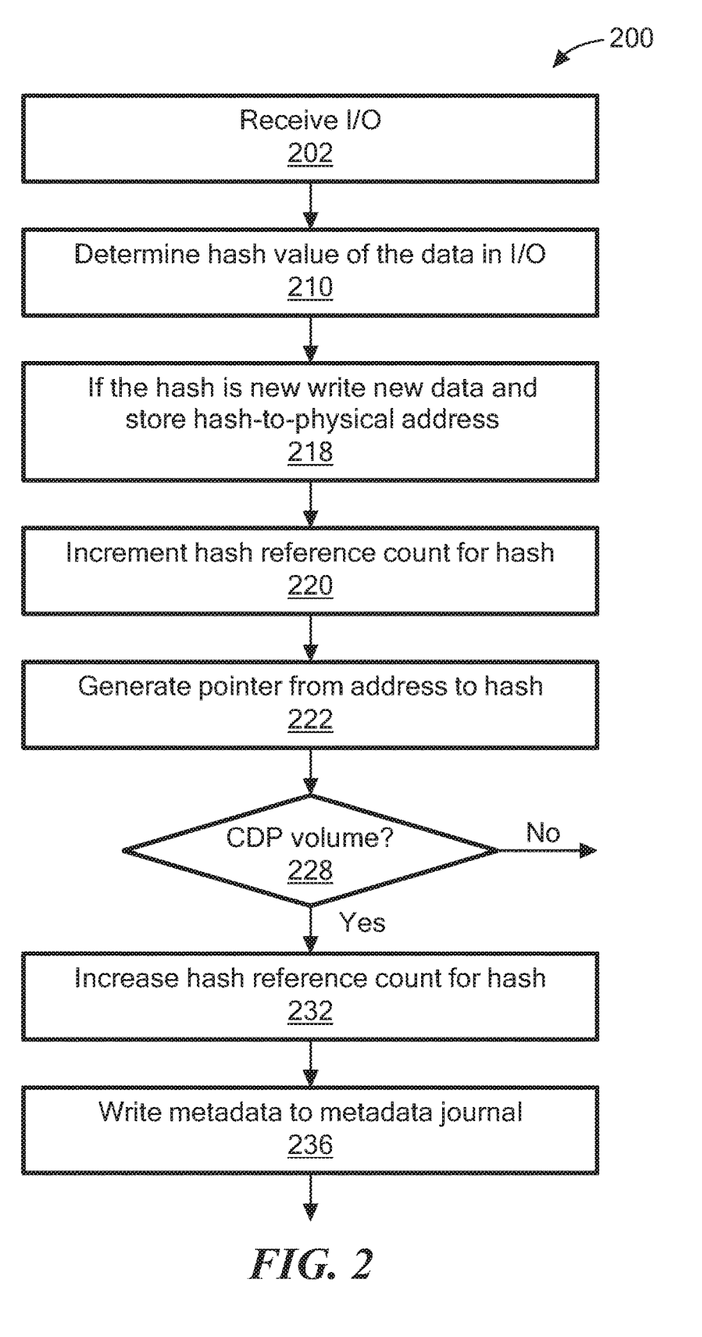
FIG. 2 is a flowchart of an example of a process to provide CDP protection, according to one embodiment of the disclosure.

Referring to FIG. 2, a process 200 is an example of a process to provide CDP protection, according to one embodiment of the disclosure. Process 200 receives an I/O (202). For example, an I/O arrives to a logical unit for which CDP is enabled.

Process 200 determines the hash value of the data in the I/O (210) and writes the new data to the storage array and stores the hash-to-physical address if the hash is new (218).

Process 200 increases the hash reference count (220). For example the hash reference count for the hash is increased by 1.

Process 200 generates a pointer from address to hash (222) and determines if the volume in the logical unit is a CDP volume (228). If the volume is a CDP volume, process 200 increases the hash reference count (232) and writes the metadata to the metadata journal (236). For example, the hash reference count for the hash in the hash reference count table 136 is increased by 1 and the metadata is written as a new journal entry in the metadata journal 118. In on example, the metadata includes a timestamp of the new journal entry generation, the offset of the data on the storage LU and the hash value.

Figure 3:
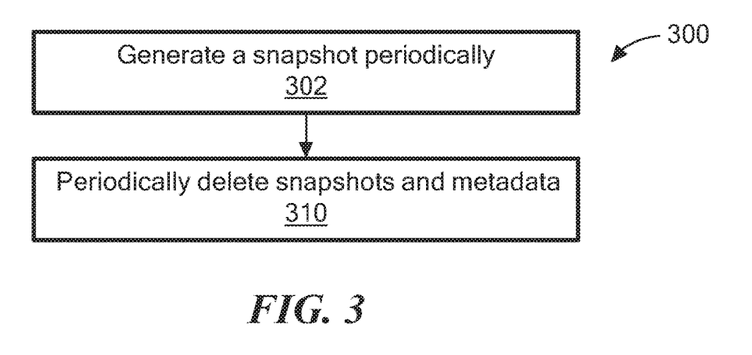
FIG. 3 is a flowchart of an example of a process to, according to one embodiment of the disclosure.

Referring to FIG. 3, a process 300 is an example of a process to manage snapshots, according to one embodiment of the disclosure. Process 300 generates a snapshot periodically (302). Since the metadata journal includes changes there is a need to periodically take a snapshot of the volume as a base point in time. In one particular example, snapshots of the volumes are generated every 6 or 12 hours.

Figure 5:
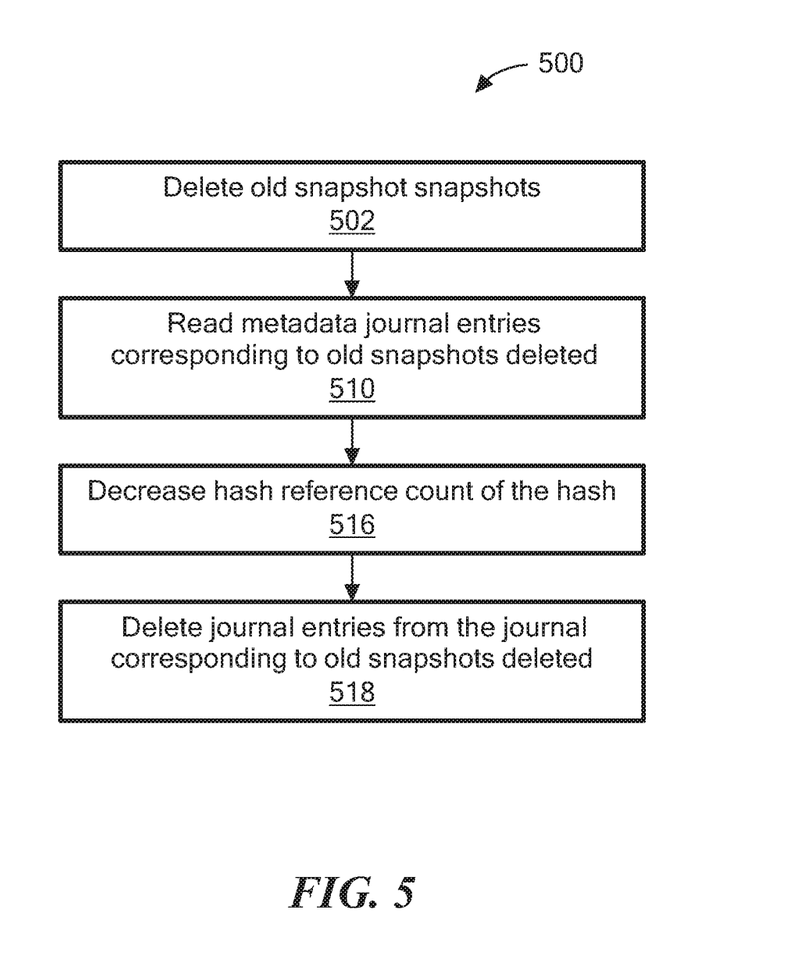
FIG. 5 is a flowchart of an example of a process to perform maintenance on snapshots and metadata journal, according to one embodiment of the disclosure.

Process 300 periodically deleted snapshots and metadata (310). For example, process 300 performs all or a portion of process 500 (FIG. 5).

Figure 4:
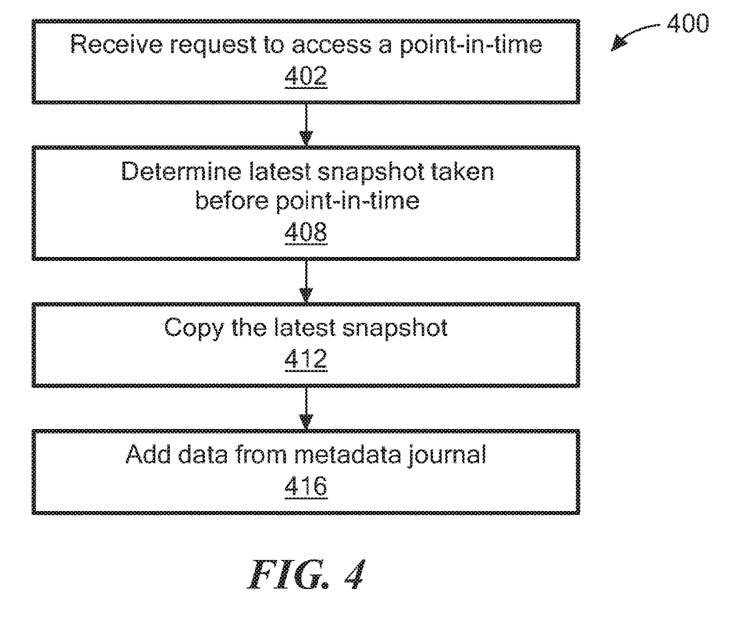
FIG. 4 is a flowchart of an example of a process to restore a volume to any point-in-time, according to one embodiment of the disclosure.

Referring to FIG. 4, a process 400 is an example of a process to restore a volume to any point-in-time, according to one embodiment of the disclosure. Process 400 receives a request to access a volume at a point-in-time (402). Process 400 determines the latest snapshot available before the requested point-in-time (408) and copy the latest snapshot available before the requested point-in-time (412).

Process 400 adds data from the metadata journal to the copy of the latest snapshot available before the requested point-in-time (416). For example, the metadata is used from the metadata journal 118 to capture the changes from the latest snapshot before the requested point-in-time up until and including the requested point-in-time by using the timestamps. In one example, changed data from the latest snapshot copied is derived from the metadata and is applied to the copy of the latest snapshot using, for example, an xcopy command, or any other method. Since the journal contains the hash value for the data that should appear in the point-in-time, the address-to-hash value of the data in the snapshot can be changed to the hash value of the relevant point-in-time and thus the volume will have the relevant data of the desired point-in-time Referring to FIG. 5, a process 500 is an example of a process to perform maintenance on snapshots of volumes and the metadata journal, according to one embodiment of the disclosure. As described herein the CDP includes generating snapshots of volumes in the storage array and writing metadata to metadata journal. In one example, the system 100 has limited storage space to save theses snapshots. Process 500 is used to "cleanup" the storage array.

Process 500 deletes old snapshots (502). For example, snapshots of volumes older than a predetermined time are deleted. In one particular example, if snapshots are generated every 6 or 12 hours then snapshots older than 14 days are deleted.

Process 500 reads the metadata journal entries corresponding to the older snapshots deleted (510). For example, the process 500 reads the hash value for each journal entry in the metadata journal 118 corresponding to the older snapshots deleted in processing block 502 (e.g., read the entries which relates to a timestamp generated between the generation time of the deleted snapshot and the generation time of the following snapshot).

Process 500 decreases the hash reference count value for each hash included in the metadata journal entries read. For example, the hash reference count value in hash reference count table 136 for each hash included in the metadata journal entries read in processing block 510 are decreased by 1.

Process 500 deletes journal entries corresponding to the older snapshots deleted (518). For example, journal entries corresponding to the older snapshots deleted in processing block 502 are deleted from the metadata journal 118.

Figure 6:
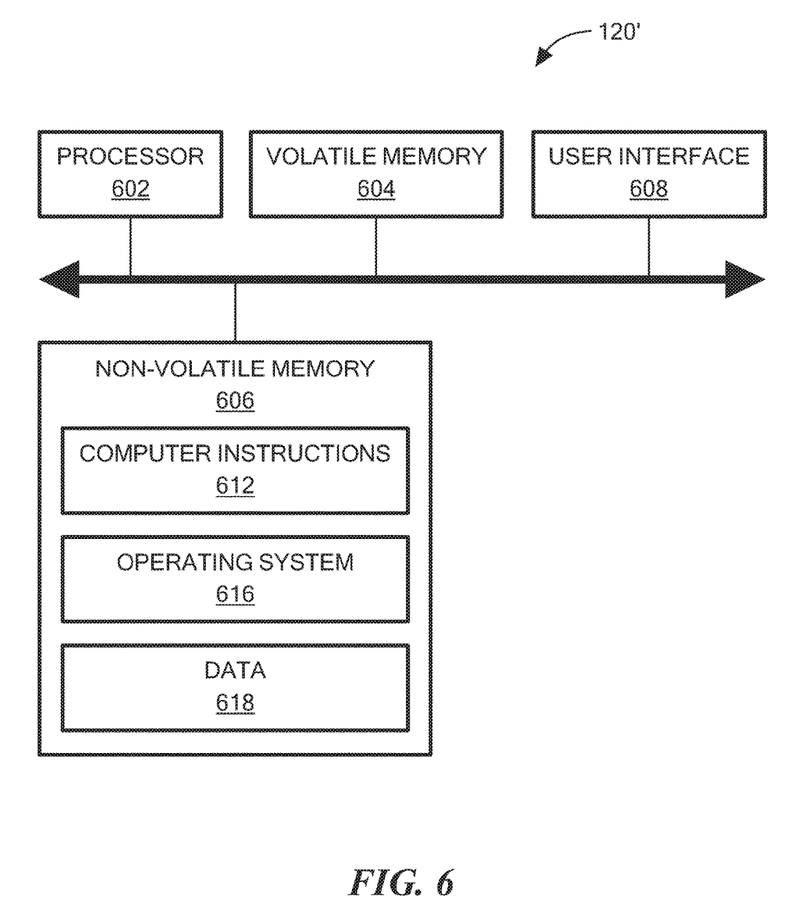
FIG. 6 is a block diagram of an example of a computer on which any portion of the processes of FIGS. 2 to 5 may be implemented, according to one embodiment of the disclosure.

Referring to FIG. 6, in one example, a CDP module 120 is a CDP module 120', according to one embodiment of the disclosure. In one example, CDP module 120' includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 200, 300, 400 and 500).

The processes described herein (e.g., process processes 200, 300, 400 and 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300, 400 and 500 are not limited to the specific processing order of FIGS. 2 to 5, respectively. Rather, any of the processing blocks of FIGS. 2 to 5 may be re-ordered, combined or removed, performed in parallel or in serial, as necessary, to achieve the results set forth above.

The processing blocks (for example, in the processes 200, 300, 400 and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method for providing continuous data protection on a storage array, the method comprising:
   receiving, at a continuous data protection (CDP) module of the storage array, an I/O to write data to a production volume stored on the storage array;
   increasing, by the CDP module, a hash reference count in a hash reference count table for a hash of the data in response to receiving the I/O;
   periodically generating snapshots of the production volume;
   adding metadata on the I/O and a timestamp to a metadata journal;
   increasing the hash reference count in the hash reference count table in response to adding the metadata;
   receiving, at the CDP module, a request to access a point-in-time of the production volume;
   determining, by the CDP module, a snapshot before the requested point-in-time;
   copying, by the CDP module, the snapshot to form a copy of the snapshot;
   applying data that changed since the snapshot to the requested point-in-time to the copy of the snapshot using the metadata; and
   restoring the production volume based on the snapshot determined before the requested point in time.

2. The method of claim 1, wherein applying data using the metadata comprises using timestamps in the metadata journal to determine the data that changed from the snapshot to the requested point-in-time.

3. The method of claim 2, wherein applying data using the metadata comprises one of:
   using an xcopy command to apply the data that changed to the copy of the snapshot; and
   changing the metadata of an address to point to a new hash.

4. The method of claim 1, wherein receiving an I/O to write data to a production volume comprises receiving the I/O to write data to a production volume stored on a deduplicated storage array.

5. The method of claim 1, further comprising:
   periodically deleting the snapshots;
   reading journal entries in the metadata journal corresponding to the snapshot deleted;
   decreasing a hash reference count value of each hash corresponding to the journal entries read; and
   deleting the journal entries read.

6. An apparatus for providing continuous data protection on a storage array, the apparatus comprising:
   electronic hardware circuitry configured to:
      receive, at a continuous data protection (CDP) module of the storage array, an I/O to write data to a production volume stored on the storage array;
      increase, by the CDP module, a hash reference count in a hash reference count table for a hash of the data in response to receiving the I/O;
      periodically generate snapshots of the production volume;
      add metadata on the I/O and a timestamp to a metadata journal;
      increase the hash reference count in the hash reference count table in response to adding the metadata;
      receive, at the CDP module, a request to access a point-in-time of the production volume;
      determine, by the CDP module, a snapshot before the requested point-in-time;
      copying, by the CDP module, the snapshot to form a copy of the snapshot;
      apply data that changed since the snapshot to the requested point-in-time to the copy of the snapshot using the metadata; and
      restore the production volume based on the snapshot determined before the requested point in time.

7. The apparatus of claim 6, wherein the circuitry comprises at least one of a processor, a memory, a programmable logic device or a logic gate.

8. The apparatus of claim 6, wherein the circuitry configured to apply data using the metadata comprises circuitry configured to use timestamps in the metadata journal to determine the data that changed from the snapshot to the requested point-in-time.

9. The apparatus of claim 8, wherein circuitry configured to apply data using the metadata comprises one of:
circuitry configured to use an xcopy command to apply the data that changed to the copy of the snapshot; and
circuitry configured to change the metadata of an address to point to a new hash.

10. The apparatus of claim 6, wherein the circuitry configured to receive an I/O to write data to a production volume comprises circuitry configured to receive the I/O to write data to a production volume stored on a deduplicated storage array.

11. The apparatus of claim 6, further comprising circuitry configured to:
periodically delete the snapshots;
read journal entries in the metadata journal corresponding to the snapshot deleted;
decrease a hash reference count value of each hash corresponding to the journal entries read; and
delete the journal entries read.

12. An article for providing continuous data protection on a storage array, the article comprising:
a non-transitory computer-readable medium that stores computer-executable instructions, the instructions causing a machine to:
receive, at a continuous data protection (CDP) module of the storage array, an I/O to write data to a production volume stored on the storage array;
increase, by the CDP module, a hash reference count in a hash reference count tale for a hash of the data in response to receiving the I/O;
periodically generate snapshots of the production volume;
add metadata on the I/O and a timestamp to a metadata journal;
increase the hash reference count in the hash reference count table in response to adding the metadata;
receive, at the CDP module, a request to access a point-in-time of the production volume;
determine, by the CDP module, a snapshot before the requested point-in-time;
copying, by the CDP module, the snapshot to form a copy of the snapshot;
apply data that changed since the snapshot to the requested point-in-time to the copy of the snapshot using the metadata; and
restore the production volume based on the snapshot determined before the requested point in time.

13. The article of claim 12, wherein the instructions causing the machine to apply data using the metadata comprises instructions causing the machine to use timestamps in the metadata journal to determine the data that changed from the snapshot to the requested point-in-time.

14. The article of claim 13, wherein the instructions causing the machine to apply data using the metadata comprises one of:
instructions causing the machine to use an xcopy command to apply the data that changed to the copy of the snapshot; and
instructions causing the machine to change the metadata of an address to point to a new hash.

15. The article of claim 12, wherein the instructions causing the machine to receive an I/O to write data to a production volume comprises instructions causing the machine to receive the I/O to write data to a production volume stored on a deduplicated storage array.

16. The article of claim 12, further comprising instructions causing the machine to:
periodically delete the snapshots;
read journal entries in the metadata journal corresponding to the snapshot deleted;
decrease a hash reference count value of each hash corresponding to the journal entries read; and
delete the journal entries read.

* * * * *